Feb. 25, 1964    H. P. ISKENDERIAN    3,122,484
REACTOR HAVING FUEL ELEMENT COATED WITH BURNABLE POISON
Filed April 18, 1960    2 Sheets-Sheet 1
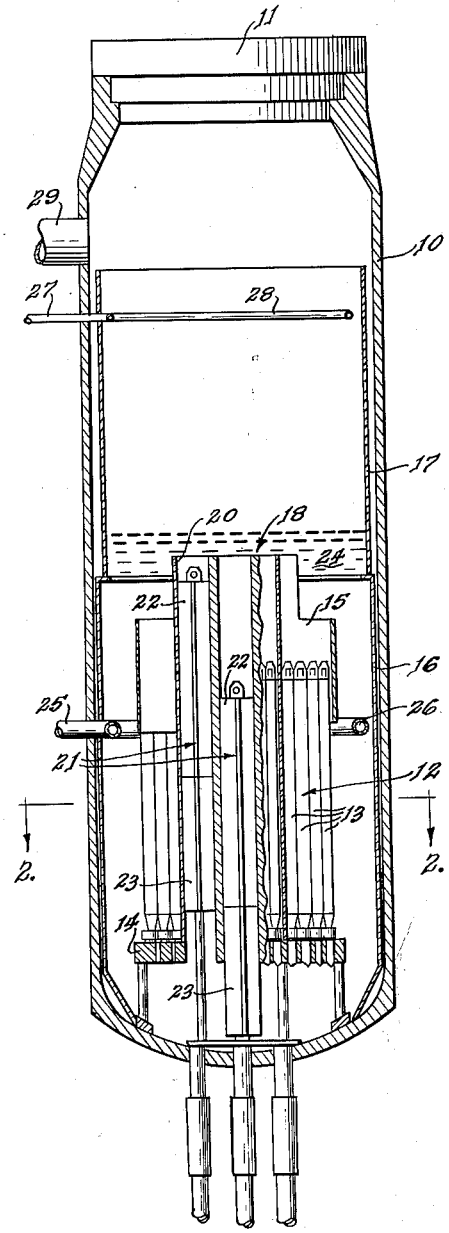
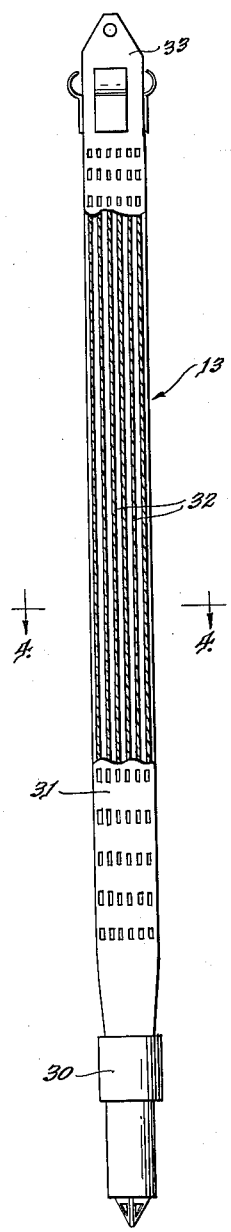
INVENTOR.
Haig P. Iskenderian
BY
Roland A. Anderson
Attorney Feb. 25, 1964    H. P. ISKENDERIAN    3,122,484
REACTOR HAVING FUEL ELEMENT COATED WITH BURNABLE POISON
Filed April 18, 1960    2 Sheets-Sheet 2
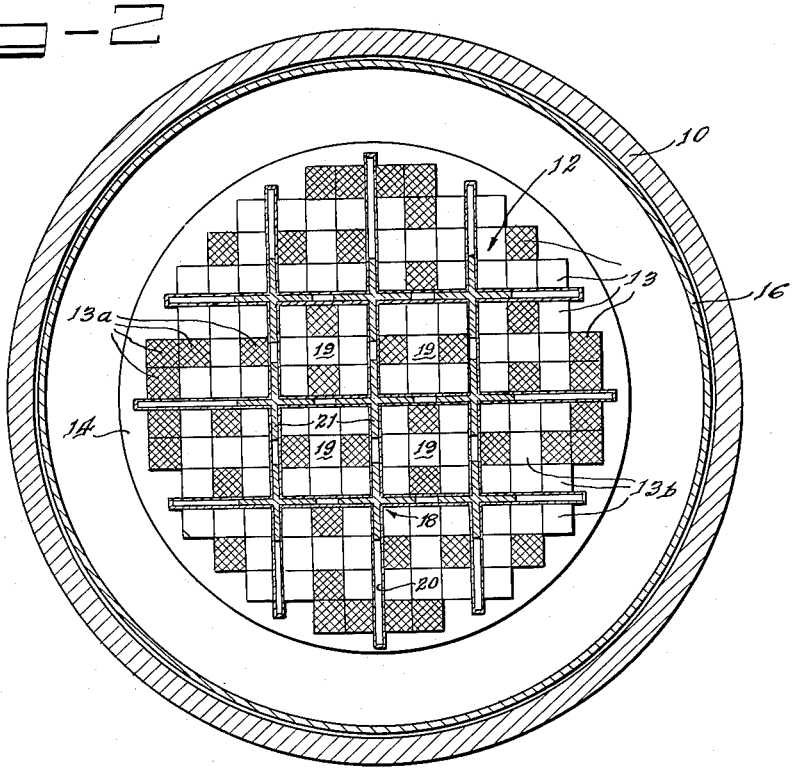
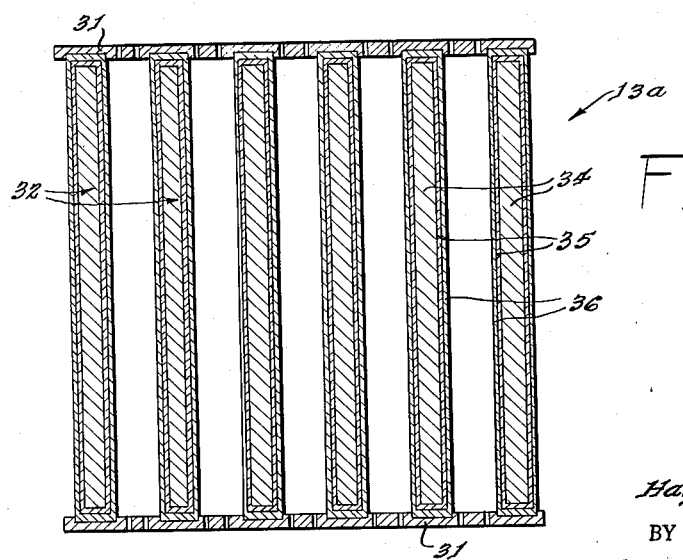
INVENTOR.
Haig P. Iskenderian
BY
Roland A. Anderson
Attorney

3,122,484
REACTOR HAVING FUEL ELEMENT COATED WITH BURNABLE POISON

Haig P. Iskenderian, Elmhurst, Ill., assignor to the United States of America as represented by the United States Atomic Energy Commission
Filed Apr. 18, 1960, Ser. No. 23,112
3 Claims. (Cl. 176—18)

The present invention relates generally to nuclear reactors, and more particularly to compensation for fuel depletion and poison build-up in a nuclear reactor.

If a nuclear reactor is constructed with only enough reactivity to achieve criticality, operation of the reactor will result in loss of criticality in a short period of time. At the start of operations two processes begin which reduce the reactivity of the reactor. The first process is generally known as "fuel depletion" and signifies the decrease in the number of atoms of thermal-neutron-fissionable material within the reactor due to fissioning of these atoms. The second process occurs simultaneously and is known as "poison build-up" or the build-up within the reactor of fission products having substantial thermal neutron capture cross sections.

Nuclear reactors, therefore, are always built so that they include an amount of excess reactivity over that amount just necessary to sustain a chain reaction and this excess reactivity is obtained by incorporation in the reactor of a quantity of fissionable material in excess of the critical mass.

The excess reactivity built into a nuclear reactor requires a control system of sufficient capacity to reduce the neutron reproduction ratio within the reactor to below unity under all conditions. This control system must be of sufficient capacity to hold under control the excess reactivity provided for fuel depletion and for overcoming fission product build-up.

It is desirable to maintain the control system of a reactor at as small a capacity as is consistent with safety since a large number of control elements require a large number of openings in the pressure vessel of the reactor and complicate the construction of the reactor.

As used in this specification and claims, the term "fissionable material" means a material fissionable by neutrons of thermal energy such as U-235, U-233, and Pu239, a fertile material is a material capable of being transformed into a fissionable material by capture of a neutron such as U-238 and Th-232, and a burnable poison is a nonfissionable neutron-absorbing material which burns out at a rate which reduces the negative reactivity introduced into the reactor by the material at a rate approximately equal to the decline in excess reactivity due to fuel depletion.

It is accordingly an object of the present invention to develop a nuclear reactor which includes means for compensating for fuel depletion and fission product build-up having unique advantages.

It is a more detailed object of the present invention to develop a nuclear reactor employing a fuel of low enrichment wherein a part of this fuel does not add to the reactivity of the reactor until it is needed and wherein there is a build-up of fissionable material within this portion of the fuel.

These and other objects of the present invention are attained by a nuclear reactor containing, in addition to a critical mass of fissionable material, fuel elements comprised of a predominant amount of a fertile material and a minor amount of a fissionable material which are covered with a layer of a material having a high capture cross section for thermal neutrons and a low capture cross section for epithermal neutrons. This layer is initially of sufficient thickness to absorb all thermal neutrons impinging thereon, thereby effectively removing the fuel element from the reactor so far as its effect on the reactivity of the reactor is concerned. Since this layer absorbs neutrons it also acts as a control poison to reduce the reactivity of the reactor merely by virtue of its presence. It is also sufficiently thin to be penetrated by epithermal neutrons and to burn out during the life of the reactor. While the layer is present, thermal neutrons cannot penetrate the layer to cause fissions in the fissionable material within the fuel element but epithermal neutrons can penetrate the layer to be absorbed by the fertile material within the fuel element forming thereby additional fissionable material. When the reactor has operated over a period of time fission product poisons will have built up in the reactor and fuel will have burned out, but the layer of poison will also have burned out thereby increasing the reactivity of the reactor by removing the poison and making available the fissionable material initially present in the fuel element and also the fissionable material formed by capture of resonance neutrons by the fertile material in the fuel element. There will be, of course, an intermediate period between the time the layer has burned out enough so that an appreciable number of thermal neutrons penetrate the layer and the time the layer is burned out completely. During this time the layer acts as a burnable poison as defined above. It will be noted that the poison layer does not function primarily as a burnable poison since its effect on the reactivity of the reactor is relatively constant for a considerable portion of the life of the reactor.

A particularly suitable poison material is cadmium because this metal is readily available and has a high thermal neutron capture cross section and a low epithermal neutron capture cross section. Another suitable material is gadolinium, while samarium can be used, although being somewhat less suitable. Boron, on the other hand, which has been used extensively as a burnable poison cannot be used according to this invention since it is a 1/v. absorber with high thermal cross section and therefore has a relatively high capture cross section for epithermal neutrons.

For a more detailed description of the invention reference is made to the accompanying drawings wherein:

FIGURE 1 is a vertical sectional view of a nuclear reactor to which my invention is applied, FIGURE 2 is a horizontal sectional view looking in the direction of the arrows 2—2 in FIGURE 1, FIGURE 3 is a vertical view taken partly in section of a fuel element for the nuclear reactor, and FIGURE 4 is an enlarged horizontal sectional view taken in the direction of the arrows 4—4 in FIGURE 3.

The reactor selected to illustrate the present invention is a boiling-water reactor of the Experimental Boiling Water Reactor (EBWR) type. For complete details on the EBWR, reference is made to report No. ANL–5607 which is available from the United States Government Printing Office.

Referring now to FIGS. 1 and 2 of the drawing the reactor comprises a pressure vessel 10 which is provided with a cover plate 11 and contains a core 12. Core 12 consists of vertically extending, closely-packed fuel assemblies 13 supported at the lower end by a lower grid plate 14 and guided at the top by a top shroud 15. Fuel assemblies 13 are of two forms 13a and 13b. A cylindrical thermal shield 16 is disposed in the lower portion of pressure vessel 10 adjacent thereto, while a cylindrical shock shield 17 is disposed in the upper portion of the pressure vessel and is supported by the thermal shield. A cellular control rod guide 18 defines 12-inch square cells 19 and control rod channels 20. Each of cells 19 has a capacity of nine fuel assemblies 13.

Control of the reactor is effected by nine cross-type control rods 21. Each of the nine rods has a 2% boron stainless steel absorber section 22 and a follower section 23 containing $U^{235}$. Control rods 21 are translated within channels 20 by control drives (not shown) located beneath the pressure vessel 10.

The pressure vessel 10 contains a body of water 24 which serves as neutron moderator and coolant. Feedwater is introduced into pressure vessel 10 by means of an inlet pipe 25 and a distribution ring 26 located near the top of core 12. Inlet pipe 27 and distribution ring 28 are provided so that a solution of boric acid can be introduced into the reactor for emergency control. Steam outlet pipe 29 is provided to direct the steam developed in the reactor to a location where it will do useful work.

All fuel assemblies 13 include a lower locating end fitting 30, perforated side plates 31, fuel plates 32, and a top fuel handling fitting 33. Fuel assemblies 13a contain fuel plates 32 consisting of a central portion 34 of slightly enriched uranium, a poison layer 35 of cadmium completely covering the uranium, and Zircalloy-II cladding 36 completely covering the cadmium. Fuel assemblies 13a are those fuel assemblies provided to increase the lifetime of the reactor in accordance with the present invention. Fuel assemblies 13b are identical to fuel assemblies 13a except that they do not contain cadmium layer 35. Fuel assemblies 13b need not be further described as they are conventional in character.

As used in this specification and claims the term "fuel element" is generic to fuel assemblies 13 and fuel plates 32.

According to the preferred form of the invention all of the fuel plates 32 within a given fuel assembly 13 are of the same kind, that is, either all or none of these plates contain a cadmium layer 35. It will be apparent, however, that the invention can be carried out by employing fuel assemblies within which some but not all of the fuel plates 32 contain a cadmium layer 35.

Each fuel assembly 13 contains six fuel plates 32 which are 60 inches long, 3⅝ inches wide, and 0.25 inch thick. The uranium is enriched to between 2.6 and 3.0% and the thickness of the layer of cadmium is .0497 cm.

Fuel assemblies 13a are distributed through the core 12 of the reactor in a regular pattern shown by the cross hatching in FIG. 2. The exact number to use will depend on the enrichment. Forty-four of these fuel assemblies 13a and 124 fuel assemblies 13b are provided. The number of poison-containing fuel assemblies 13a employed in the operating reactor will be between 24 and 44.

The basic 24 poisoned fuel assemblies 13a are disposed in the core of the reactor two to a cell 19. As shown in FIG. 2 the poisoned fuel assemblies 13a are disposed in the center of opposite rows of fuel assemblies 13 of each cell 19 with the lines defined by poisoned fuel assemblies 13a in adjacent cells 19 being at right angles. The remainder of the poisoned fuel assemblies 13a are disposed regularly about the periphery of the reactor.

To start up the reactor all 44 poisoned fuel assemblies 13a are included in the core. The peripheral fuel assemblies 13a are then replaced one by one with regular fuel assemblies 13b until the reactor becomes critical and operating power is attained. It will be apparent that the presence or absence of peripheral fuel assemblies 13a changes the reflector savings thereby having an additional effect on reactivity.

The cadmium layer 35 remains black to thermal neutrons for approximately eight months at the designed operating flux of $1.5 \times 10^{13}$ neutrons/cm.² sec. Averaged over this time, the number of thermal neutrons penetrating the poison layer to cause fissions in the uranium fuel is negligible. Epithermal neutrons, however, can penetrate the layer and are absorbed in the $U^{238}$ content of the fuel to form plutonium. There is some fissioning of $U^{238}$ caused by fast neutrons; however, the proportion of fissions compared to captures is small.

After about eight months the poison layer has burned out to such an extent as to permit thermal neutrons to penetrate to the uranium fuel thereby causing fissions and creating heat. In addition to the $U^{235}$ content of the fuel the plutonium formed by epithermal neutron capture is also available for fissioning. At the end of eight months this plutonium will amount to about 6% of the $U^{235}$ present in the poisoned fuel assemblies. Thus additional fuel becomes available just when it is needed because of fission product build-up and fuel depletion in the regular fuel assemblies.

It will be at once apparent that application of this invention to a reactor greatly prolongs its life. This is of particular use in reactors which cannot be readily refueled frequently such as in reactors at remote locations.

This invention can be used in conjunction with a burnable poison to result in a reactor capable of operating over long periods of time with comparatively little conventional control being required.

As has been mentioned gadolinium can be substituted for cadmium in the poison layer. A layer of gadolinium .024 cm. in thickness will also remain black for about eight months but then will burn out very rapidly because of its high cross section.

Application of the invention is not restricted to a boiling-water reactor but may be to any thermal reactor having sufficient excess reactivity.

Another embodiment of the invention (not shown) utilizes fuel assemblies in which the poison layer is disposed about the entire assembly rather than about individual fuel plates within the assembly. The effect of such a poison layer is to effectively remove the entire fuel assembly from the reactor until the poison layer has burned out. After the poison layer has burned out the fissionable material contained in the fuel assembly is available to prolong the life of the reactor.

The distribution of fuel plates, or assemblies, surrounded by a poison layer may be made in the core in such a way as to attain a flattening of thermal neutron flux in the reactor.

It will be understood that this invention is not to be limited to the details given herein but that it may be modified within the scope of the appended claims.

What is claimed is:

1. A nuclear reactor comprising a core containing a plurality of vertical closely-packed fuel assemblies arranged in rectangular array disposed in a liquid moderator, a control rod guide defining a plurality of square cells each adapted to contain nine fuel assemblies, said fuel assemblies comprising a plurality of vertical, parallel fuel plates containing slightly enriched uranium, certain of said fuel assemblies containing fuel plates having a layer of cadmium thereon, said last-mentioned fuel assemblies being arranged two to each complete cell in the center of opposite rows of fuel assemblies and the line defined by the said two fuel assemblies in a cell being at right angles to the line defined by the said two fuel assemblies in adjoining cells, and additional fuel assemblies poisoned with cadmium disposed about the periphery of the reactor.

2. A nuclear reactor element which initially acts as a control poison and subsequently serves as a fuel element comprising an assembly containing a plurality of plates each consisting of a central portion of uranium enriched to between 2.6 and 3.0%, a layer of cadmium .0497 cm. thick completely covering the uranium, and cladding completely covering the cadmium.

3. In a nuclear reactor comprising a core consisting of a greater number of fuel elements, each consisting of a single fuel plate, than the number necessary to sustain a chain reaction at start-up of the reactor disposed in a moderator, each of said fuel plates consisting predominantly of a fertile material while containing a minor amount of a material fissionable by neutrons of thermal energy, the improvement comprising a layer of a poison material selected from the group consisting of cadmium, gadolinium, and samarium completely surrounding some of the fuel plates, the number of fuel plates not being surrounded by the said layer being sufficient to sustain a chain reaction at start-up of the reactor, said layer being initially of sufficient thickness to prevent thermal neutrons from passing therethrough and of such thickness as to burn out when the reactivity of the fuel plates which are not surrounded by said poison layer is no longer sufficient to support a chain reaction by themselves thereby bringing into the chain reaction the plates initially surrounded by a layer of poison material.

References Cited in the file of this patent

UNITED STATES PATENTS

| | | |
|---|---|---|
| 2,743,226 | Newson | Apr. 24, 1956 |
| 2,951,801 | Lillie | Sept. 6, 1960 |

OTHER REFERENCES

Atomic Energy Commission Document: NAA–SR–276 (Del) Huston, October 1953, pages 9–10, 204/193-Fuse.

"Peaceful Uses of Atomic Energy," United Nations, 1958, vol. 8 pages 483–486. (Copy in Group 220–C.)

Proceedings of the Second International Conference on the Peaceful Uses of Atomic Energy, vol. 8, pages 516–519, 1958, article by Elliott. (Copy in Scientific Library.)

Power Reactor Technology, vol. 2, No. 2, March 1959, pages 28, 29, 204–Burnable Poison.

AEC Document, TID–7559 (Part 1) "Fuel Elements Conference," August 1959, pages 228–229 and page 133. (Copy in Group 220–C.)